(12) United States Patent
Chang et al.

(10) Patent No.: US 8,754,955 B2
(45) Date of Patent: Jun. 17, 2014

(54) INTERFACE CIRCUIT FOR IMAGE RECEIVING APPARATUS AND DATA TRANSPORTING METHOD THEREOF

(75) Inventors: Ching-Yen Chang, New Taipei (TW); Chin-Hao Tu, New Taipei (TW)

(73) Assignee: Altek Corporation, Hsinchu (TW)

( * ) Notice: Subject to any disclaimer, the term of this patent is extended or adjusted under 35 U.S.C. 154(b) by 192 days.

(21) Appl. No.: 13/342,991

(22) Filed: Jan. 4, 2012

(65) Prior Publication Data

US 2013/0120663 A1    May 16, 2013

(30) Foreign Application Priority Data

Nov. 16, 2011   (TW) .............................. 100141857 A

(51) Int. Cl.
*H04N 5/228* (2006.01)

(52) U.S. Cl.
USPC ......... 348/222.1; 348/294; 348/298; 348/302

(58) Field of Classification Search
USPC .............. 348/222.1, 294, 298, 302, 308, 312; 250/208.1; 257/290–292
See application file for complete search history.

(56) References Cited

U.S. PATENT DOCUMENTS

2005/0046708 A1 *   3/2005   Lim et al. ................... 348/231.6

* cited by examiner

*Primary Examiner* — Yogesh Aggarwal
(74) *Attorney, Agent, or Firm* — Jianq Chyun IP Office

(57) ABSTRACT

An interface circuit for an image receiving apparatus is disclosed. The interface circuit includes a plurality of signal transporting units, and each of the signal transporting units has a first signal receiving terminal and a second signal receiving terminal for receiving a first input signal and a second input signal respectively. Each of the signal transporting units compares the first input signal and the second input signal to generate a compare result. Each of the signal transporting units outputs the first input signal and the second input signal and/or the compare result according to a setting mode.

12 Claims, 4 Drawing Sheets

INTERFACE CIRCUIT FOR IMAGE RECEIVING APPARATUS AND DATA TRANSPORTING METHOD THEREOF

CROSS-REFERENCE TO RELATED APPLICATION

This application claims the priority benefit of Taiwan application serial no. 100141857, filed Nov. 16, 2011. The entirety of the above-mentioned patent application is hereby incorporated by reference herein and made a part of this specification.

BACKGROUND OF THE INVENTION

1. Field of the Invention

The present invention relates to an interface circuit, and in particular, to an interface circuit for an image receiving apparatus and a data transporting method thereof.

2. Description of Related Art

With the development of process technologies, the quality of an image captured by a Complementary Metal Oxide Semiconductor (CMOS) sensor for performing an image capture action is dramatically improved. Moreover, in the case that the cost of the CMOS sensor is gradually reduced, the CMOS sensor has become a mainstream product in the market of image sensors other than a charge coupled device (CCD) sensor.

In addition, the CMOS sensor has different output interface circuits when being applied to different fields. For example, in a mobile phone field, the CMOS sensor uses a circuit interface with a Mobile Industry Processor Interface (MIPI) as a mainstream; while in a camera application, a Sub Low Voltage Differential Signal (sub-LVDS) circuit interface is used as the mainstream. Further, in a Digital Video (DV) camera or an image capture apparatus using the CCD sensor, a transporting interface of a parallel bus is used as a principal axis. That is to say, if it is required to develop an interface circuit common to the multiple specifications, an interface circuit having multiple input/output pins needs to be designed, so that the interfaces of the specifications can use the multiple pins respectively to complete data transporting actions. In such an interface circuit, the circuit area is increased due to the excessive input/output pins, which increases the manufacturing cost of the interface circuit.

SUMMARY OF THE INVENTION

Accordingly, the present invention is directed to an interface circuit for an image receiving apparatus, which provides transporting actions for image input signals of multiple different formats.

The present invention provides a data transporting method of an input signal interface circuit, for an image receiving apparatus to transport image input signals of different formats.

The present invention provides an interface circuit for an image receiving apparatus, including a plurality of signal transporting units, where each of the signal transporting units includes a first signal receiving terminal and a second signal receiving terminal, and the first signal receiving terminal and the second signal receiving terminal receive a first input signal and a second input signal respectively. Each of the signal transporting units compares the first input signal and the second input signal to generate a compare result, and outputs the first input signal and the second input signal and/or the compare result according to a setting mode.

In an embodiment of the present invention, each of the signal transporting units includes a first buffer, a second buffer and a comparator. The first buffer is coupled to the first signal receiving terminal to receive the first input signal, and determines whether to output the first input signal according to the setting mode. The second buffer is coupled to the second signal receiving terminal to receive the second input signal, and determines whether to output the second input signal according to the setting mode. The comparator is coupled to the first signal receiving terminal and the second signal receiving terminal to receive and compare the first input signal and the second input signal to generate a compare result. The comparator determines whether to output the compare result according to the setting mode.

In an embodiment of the present invention, each of the signal transporting units includes a first buffer, a second buffer, a comparator and a selector. The first buffer is coupled to the first signal receiving terminal to receive the first input signal. The second buffer is coupled to the second signal receiving terminal to receive the second input signal. The comparator is coupled to the first signal receiving terminal and the second signal receiving terminal to receive and compare the first input signal and the second input signal to generate a compare result. The selector is coupled to output terminals of the first buffer, the second buffer and the comparator, and selects to output the first input signal and the second input signal and/or the compare result according to the setting mode.

In an embodiment of the present invention, the interface circuit further includes a setting mode generator. The setting mode generator is coupled to the signal transporting units and generates the setting mode.

In an embodiment of the present invention, the first signal and the second signal are differential signals for each other.

In an embodiment of the present invention, the setting mode includes a differential transporting mode, a parallel transporting mode and a common transporting mode.

In an embodiment of the present invention, when the setting mode is the differential transporting mode, each of the signal transporting units outputs the compare result; when the setting mode is the parallel transporting mode, each of the signal transporting units outputs the first input signal and the second input signal; and when the setting mode is the common transporting mode, each of the signal transporting units outputs the first input signal, the second input signal and the compare result.

The present invention further provides a data transporting method for an input signal interface circuit, which is applicable to an image receiving apparatus, and includes the following steps: first, receiving a plurality of first input signals and a plurality of second input signals; comparing the first input signals and the second input signals to generate a plurality of compare results; and finally, outputting the first input signals, the second input signals and/or the compare results according to a setting mode.

On the basis of the above description, in the present invention, multiple signal transporting units are used, and each of the signal transporting units selects, according to the preset setting mode, to output the received first input signal and second input signal and/or the compare result generated according to the first input signal and the second input signal. In this way, the input signals generated by the image capture apparatus with multiple different formats may be all transmitted to the image receiving apparatus through a single interface circuit, effectively saving the required hardware cost without multiple different interface circuits.

To make the features and advantages of the present invention more comprehensible, the present invention is described in further detail below with reference to embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
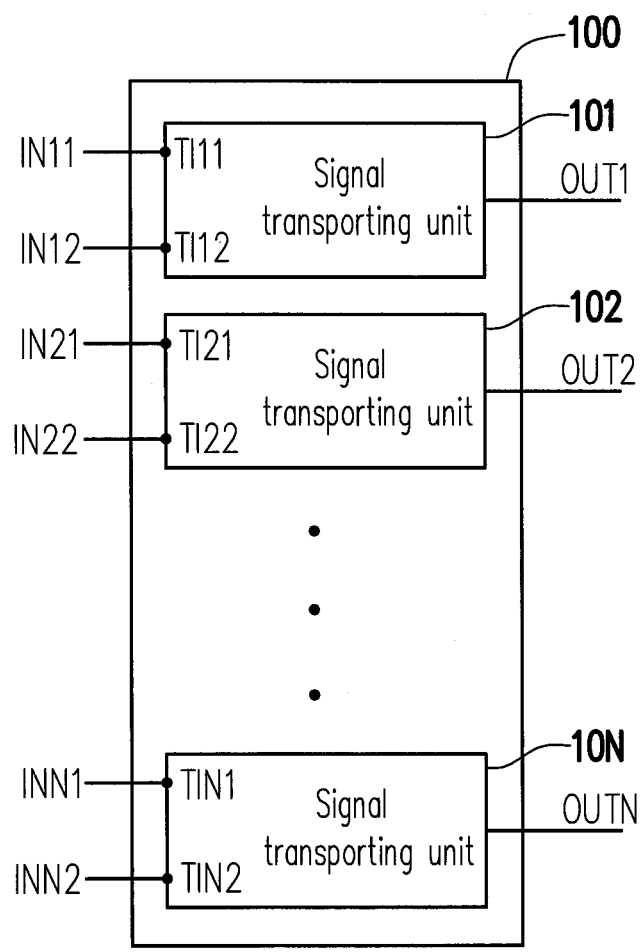
FIG. 1 is a schematic view of an interface circuit 100 of an image receiving apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of an interface circuit 100 of an image receiving apparatus according to an embodiment of the present invention. Referring to FIG. 1, the interface circuit 100 includes a plurality of signal transporting units 101 to 10N, where N is a positive integer. The signal transporting units 101 to 10N respectively have signal receiving terminals TI11 to TIN2, and the signal receiving terminals TI11 to TIN2 is used for receiving input signals IN11 to INN2 respectively. Taking the signal transporting unit 101 as an example, the signal transporting unit 101 has two signal receiving terminals TI11 and TI12. The signal transporting unit 101 receives the input signal IN11 through the signal receiving terminal TI11, and receives the input signal IN12 through the signal receiving terminal TI12.

In this embodiment, the input signals IN11 to INN2 are generated by an image capture apparatus correspondingly connected to an image receiving apparatus including the interface circuit 100. Therefore, formats of the input signals IN11 to INN2 are same as those applied by the image capture apparatus. That is to say, the input signals IN11 to INN2 may be in one of transporting formats such as an MIPI, a sub-LVDS, and a parallel bus.

The signal transporting units 101 to 10N compare the received input signals IN11 to INN2 to generate compare results. In addition, according to a setting mode, the signal transporting units 101 to 10N output the received input signals IN11 to INN2 and/or the generated compare results as output signals OUT1 to OUTN respectively. Specifically, taking the signal transporting unit 101 as an example, the signal transporting unit 101 compares voltages of the input signals IN11 and IN12, and generates a compare result according to the input signals IN11 and IN12.

In short, if the signal receiving terminal TI11 is set as a positive input terminal and the signal receiving terminal TI112 is set as a negative input terminal, when the signal transporting unit 101 judges that the voltage of the input signal IN11 is greater than that of the input signal IN12, a compare result of a logical high-level may be generated. In other words, when the signal transporting unit 101 judges that the voltage of the input signal IN11 is less than that of the input signal IN12, a compare result of a logical low-level may be generated. Moreover, the signal transporting unit 101 may generate the output signal OUT1 according to the setting mode.

In this embodiment, the setting mode includes a differential transporting mode, a parallel transporting mode and a common transporting mode. When the setting mode is the differential transporting mode, it indicates that the input signal IN11 and the input signal IN12 are differential signals for each other, and at this time, the output signal OUT1 generated by the signal transporting unit 101 is a compare result of the input signal IN11 and the input signal IN12. When the setting mode is the parallel transporting mode, the signal transporting unit 101 directly transmits the input signal IN11 and the input signal IN12 as the output signal OUT1. When the setting mode is the common transporting mode, the signal transporting unit 101 transmits the input signal IN11, the input signal IN12, and the compare result of the input signal IN11 and the input signal IN12 as the output signal OUT1.

It should be noted that, when a circuit interface used by an image sensor is an MIPI, the setting mode is equal to the common transporting mode; when a circuit interface used by the image sensor is a sub-LVDS interface, the setting mode is equal to the differential transporting mode; and when a circuit interface used by the image sensor is a parallel bus transporting interface, the setting mode is equal to the parallel transporting mode.

Figure 2:
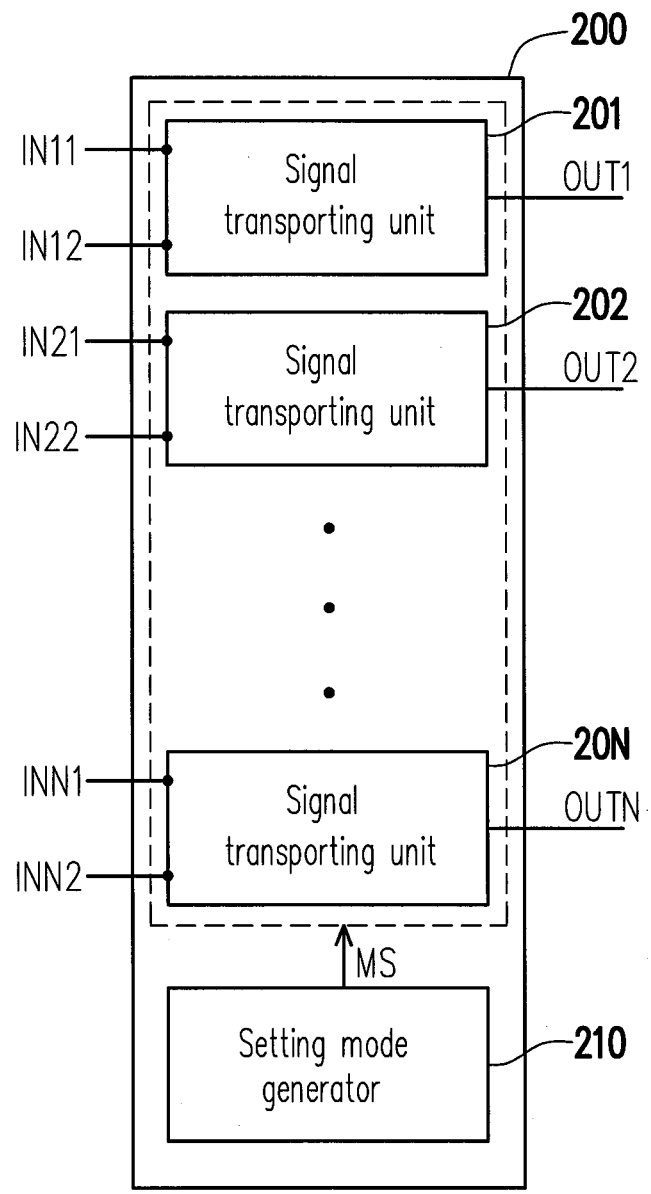
FIG. 2 is a schematic view of an interface circuit 200 of an image receiving apparatus according to an embodiment of the present invention.

FIG. 2 is a schematic view of an interface circuit 200 of an image receiving apparatus according to an embodiment of the present invention. Referring to FIG. 2, the interface circuit 200 includes a plurality of signal transporting units 201 to 20N, and a setting mode generator 210, where N is a positive integer. In this embodiment, the setting mode generator 210 is used for generating a setting mode MS, and provides the setting mode MS to the signal transporting units 201 to 20N. The setting mode generator 210 may generate the setting mode MS according to a software setting manner or a hardware setting manner.

Specifically, the setting mode generator 210 may be used by a user to perform setting through a software interface of an application program, and generates the setting mode MS accordingly. Alternatively, the setting mode generator 210 may also set the setting mode MS to be generated in a pin option manner. In the pin option manner, a logical high/low-level voltage value is added onto the multiple option pins on the interface circuit 200 to set the different setting modes MS. For example, in the case that two pins are used to set the setting mode MS, four options "00", "01", "10", and "11" may be generated in total (0 represents a logical low-level voltage applied on the pin, and 1 represents a logical high-level voltage applied on the pin).

Definitely, the setting mode generator 210 may also be a non-volatile memory, and stores the setting mode MS in the setting mode generator 210 in a burn-write manner, and then transmits the setting mode MS to the signal transporting units 201 to 20N. When the setting mode MS needs to be changed, a new setting mode MS may be rewritten to the setting mode generator 210.

Figure 3A:
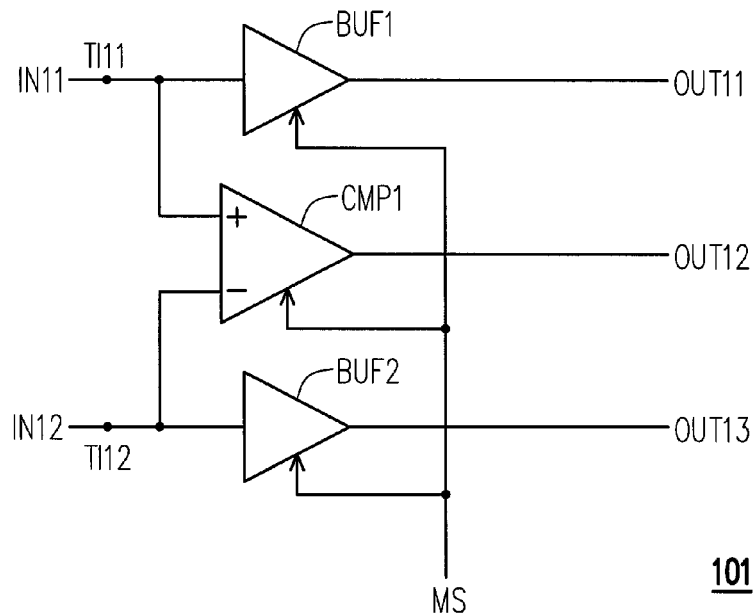
FIG. 3A is a schematic view of an embodiment of a signal transporting unit 101 according to an embodiment of the present invention.

FIG. 3A is a schematic view of an embodiment of a signal transporting unit 101 according to an embodiment of the present invention. Referring to FIG. 3A, the signal transporting unit 101 includes buffers BUF1, BUF2 and a comparator CMP1. The buffer BUF1 is coupled to the signal receiving terminal TI11 to receive the input signal IN11. The buffer BUF2 is coupled to the signal receiving terminal TI12 to receive the input signal IN12. The comparator CMP1 is coupled to the signal receiving terminals TI11 and TI12 to receive and compare the input signals IN11 and IN12 to generate a compare result OUT12. It should be noted that, the buffers BUF1 and BUF2, and the comparator CMP1 all receive the setting mode MS. The buffers BUF1 and BUF2, and the comparator CMP1 decides whether to provide the generated output signals OUT11 and OUT13, and the compare result OUT12 as the output signal OUT1 of the signal transporting unit 101 according to the setting mode MS.

It should be noted that, when deciding whether to provide the generated output signals OUT11, OUT13, and OUT12 according to the setting mode MS, the buffers BUF1 and BUF2, and the comparator CMP1 appropriately adjust electrical characteristics of the input signals IN11 and IN12 according to the setting mode MS to generate the output signals OUT11 and OUT13. In short, when the setting mode MS is equal to the MIPI, the buffers BUF1 and BUF2, and the comparator CMP1 provide the output signals OUT11, OUT13 and OUT12 conforming to the electrical characteristics specified by the MIPI according to the setting mode MS. When the setting mode MS is equal to the sub-LVDS, the comparator CMP1 provides the output signal OUT12 conforming to the electrical characteristics specified by the sub-LVDS according to the setting mode MS. When the setting mode. MS is equal to the parallel bus transporting format, the buffers BUF1 and BUF2 provide the output signals OUT11 and OUT13 conforming to the electrical characteristics specified by the parallel bus transporting format according to the setting mode MS.

Figure 3B:
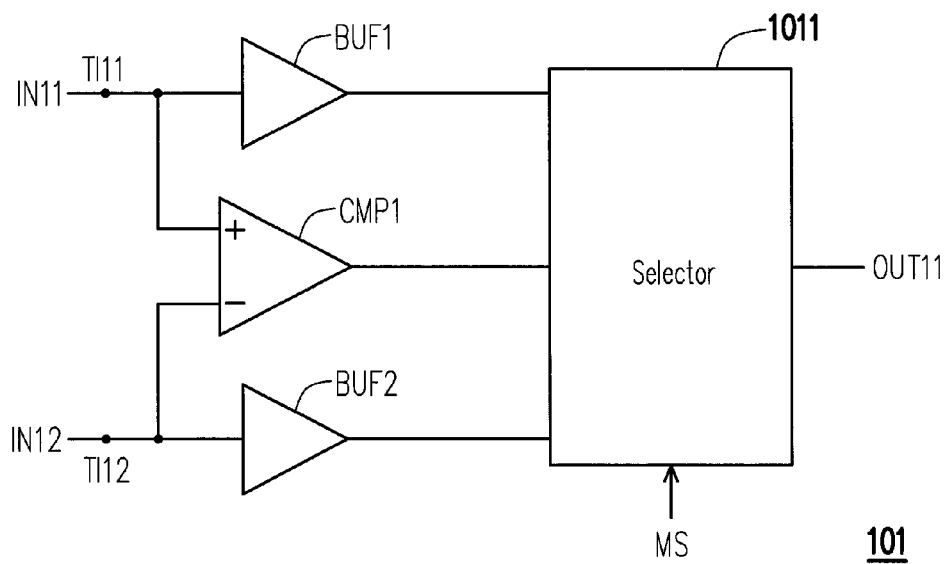
FIG. 3B is a schematic view of another embodiment of a signal transporting unit 101 according to an embodiment of the present invention.

FIG. 3B is a schematic view of another embodiment of a signal transporting unit 101 according to an embodiment of the present invention. Referring to FIG. 3B, in this embodiment, the signal transporting unit 101 includes buffers BUF1 and BUF2, a comparator CMP1 and a selector 1011. The buffer BUF1 is coupled to the signal receiving terminal TI11 to receive the input signal IN11. The buffer BUF2 is coupled to the signal receiving terminal TI12 to receive the input signal IN12. The comparator CMP1 is coupled to the signal receiving terminals TI11 and TI12 to receive and compare the input signals IN11 and IN12, to generate a compare result. The selector 1011 is coupled to output terminals of the buffers BUF1 and BUF2, and the comparator CMP1 and receives a setting mode MS. The selector 1011 selects to output a compare result generated by the comparator CMP1 or output of the buffers BUF1 and BUF2, or output the compare result generated by the comparator CMP1 and the output of the buffers BUF1 and BUF2 at the same time according to the setting mode MS.

Here, the selector 1011 selects the output generated by the buffers BUF1 and BUF2, and the comparator CMP1 to generate the output signal OUT11, and further adjusts the electrical characteristic of the output signal OUT11 according to the setting mode MS, so that the output signal OUT11 may conform to an electrical characteristic of a mode designated by the setting mode MS.

Figure 4:
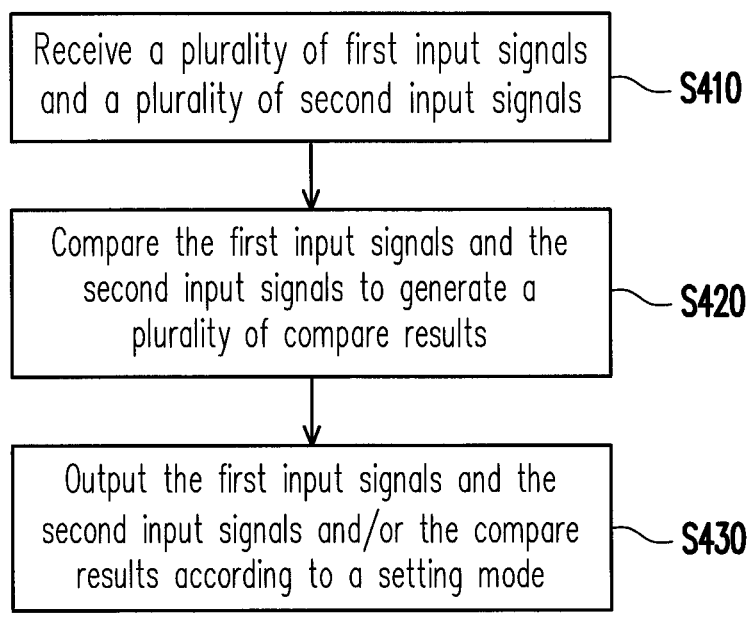
FIG. 4 is a flowchart of a data transporting method for an input signal interface circuit.

FIG. 4 is a flowchart of a data transporting method for an input signal interface circuit, which is applicable to an image receiving apparatus. The data transporting method includes the following steps: first, receiving a plurality of first input signals and a plurality of second input signals (S410); then, comparing the first input signals and the second input signals to generate a plurality of compare results (S420); finally, outputting the first input signals and the second input signals and/or the compare results according to a setting mode. As for the details of the steps of the data transporting method, reference is made to the foregoing embodiments and the manners thereof, which are not described in detail herein again.

To sum up, in the present invention, the signal transporting unit is used to compare the received input signals, and output the received input signals and/or the compare result according to the setting mode. In this way, the interface circuit of the image receiving apparatus can receive image signals of multiple different specifications through a few pins, thus effectively reducing the circuit cost of the image receiving apparatus.

It will be apparent to persons skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interface circuit for an image receiving apparatus, comprising:
a plurality of signal transporting units, wherein each of the signal transporting units comprises a first signal receiving terminal and a second signal receiving terminal for receiving a first input signal and a second input signal respectively, each of the signal transporting units compares the first input signal and the second input signal to generate a compare result, and outputs the first input signal and the second input signal, and each of the signal transporting units determines to whether further output the compare result or not according to a setting mode.

2. The interface circuit for an image receiving apparatus according to claim 1, wherein each of the signal transporting units comprises:
a first buffer, coupled to the first signal receiving terminal to receive the first input signal, and determining whether to output the first input signal according to the setting mode;
a second buffer, coupled to the second signal receiving terminal to receive the second input signal, and determining whether to output the second input signal according to the setting mode; and
a comparator, coupled to the first signal receiving terminal and the second signal receiving terminal to receive and compare the first input signal and the second input signal to generate a compare result, and determining whether to output the compare result according to the setting mode.

3. The interface circuit for an image receiving apparatus according to claim 1, wherein each of the signal transporting units comprises:
a first buffer, coupled to the first signal receiving terminal to receive the first input signal;
a second buffer, coupled to the second signal receiving terminal to receive the second input signal;
a comparator, coupled to the first signal receiving terminal and the second signal receiving terminal to receive and compare the first input signal and the second input signal to generate a compare result; and
a selector, coupled to output terminals of the first buffer, the second buffer and the comparator, and selecting to output the first input signal and the second input signal and/or the compare result according to the setting mode.

4. The interface circuit for an image receiving apparatus according to claim 1, further comprising:
a setting mode generator, coupled to the signal transporting units, and generating the setting mode.

5. The interface circuit for an image receiving apparatus according to claim 1, wherein the first signal and the second signal are differential signals for each other.

6. The interface circuit for an image receiving apparatus according to claim 1, wherein the setting mode comprises a differential transporting mode, a parallel transporting mode and a common transporting mode.

7. The interface circuit for an image receiving apparatus according to claim 1, wherein when the setting mode is a differential transporting mode, each of the signal transporting units outputs the compare result; when the setting mode is a parallel transporting mode, each of the signal transporting units outputs the first input signal and the second input signal; and when the setting mode is a common transporting mode, each of the signal transporting units outputs the first input signal, the second input signal, and the compare result.

8. A data transporting method for an input signal interface circuit, applicable to an image receiving apparatus, comprising:
receiving a plurality of first input signals and a plurality of second input signals;
comparing the first input signals and the second input signals to generate a plurality of compare results; and
outputting the first input signals and the second input signals, wherein whether the compare result is further outputted or not is determined according to a setting mode.

9. The data transporting method according to claim 8, wherein the setting mode is generated in a software setting manner or a hardware setting manner.

10. The data transporting method according to claim 8, wherein each of the first signals and corresponding each of the second signals are differential signals for each other.

11. The data transporting method according to claim 8, wherein the setting mode comprises a differential transporting mode, a parallel transporting mode and a common transporting mode.

12. The data transporting method according to claim 11, wherein when the setting mode is the differential transporting mode, each of the signal transporting units outputs the compare result; when the setting mode is the parallel transporting mode, each of the signal transporting units outputs the first input signal and the second input signal; and when the setting mode is the common transporting mode, each of the signal transporting units outputs the first input signal, the second input signal, and the compare result.

* * * * *